US007970668B2

(12) United States Patent
Ahluwalia et al.

(10) Patent No.: US 7,970,668 B2
(45) Date of Patent: Jun. 28, 2011

(54) SYSTEM AND METHOD FOR AUTOMATED COMPREHENSIVE RECONCILIATION PROCESSING

(75) Inventors: Manik Ahluwalia, Gurgoan (IN); Rupali Pal, Gurgoan (IN); Ruchika Arun, Gurgoan (IN); Uday Rao Kadam, Gurgoan (IN); Vikram Bansal, Gurgoan (IN)

(73) Assignee: American Express Travel Related Services Company, Inc., New York, NY (US)

( * ) Notice: Subject to any disclaimer, the term of this patent is extended or adjusted under 35 U.S.C. 154(b) by 311 days.

(21) Appl. No.: 12/141,151

(22) Filed: Jun. 18, 2008

(65) Prior Publication Data
US 2009/0171820 A1 Jul. 2, 2009

(30) Foreign Application Priority Data

Dec. 26, 2007 (IN) .......................... 3103/CHE/2007

(51) Int. Cl.
*G07B 17/00* (2006.01)

(52) U.S. Cl. ............................. 705/30; 705/39; 705/40
(58) Field of Classification Search .................. 705/30, 705/39–40
See application file for complete search history.

(56) References Cited

U.S. PATENT DOCUMENTS

| 7,353,182 B1* | 4/2008 | Missinhoun et al. | 705/8 |
| 2002/0026416 A1* | 2/2002 | Provinse | 705/39 |
| 2005/0044015 A1* | 2/2005 | Bracken et al. | 705/30 |
| 2005/0114239 A1* | 5/2005 | Fiascone et al. | 705/30 |
| 2008/0120211 A1* | 5/2008 | Oppenheimer et al. | 705/30 |

* cited by examiner

*Primary Examiner* — Vanel Frenel
(74) *Attorney, Agent, or Firm* — Snell & Wilmer L.L.P.

(57) ABSTRACT

A system and method of reconciliation processing that automates multiple steps of data validation. One of the key steps of reconciliation is the review and validation of the input and outputs. An embodiment of this invention includes the maintenance of an automated checklist of the various reconciliation steps, which enables maintaining an audit trail and the generation of metrics. A web-based system can be implemented to achieve the objectives of improving the reconciliation process and utilizing computerized controls.

16 Claims, 9 Drawing Sheets

| Metrics Related to Process | | | | |
|---|---|---|---|---|
| | FUNCTION | DEFECT | RELATED TO PROCESS METRIC | OPERATIONAL DEFINITION / MEASUREMENT |
| DATA CAPTURE | Collect data | Source data not received / captured by SLA date | Percentage of data sources not captured by SLA date | The number of input sources that are not captured into the reconciliation process per SLA date / the number of expected input sources |
| | Collect data | Source data received or captured late | The amount of time (hours) that data was late | Difference between the # hours (post SLA date) for input data and the actual SLA date |
| | Perform Quality Check | Source data file is not complete | Percentage of data sources with incomplete content | Number of files that are incomplete or do not comply with sub-ledger acceptance criteria / Number of files received |
| | Perform Quality Check | Source data file is not accurate | Percentage of data sources with inaccurate content | Number of files that are inaccurate or do not comply with sub-ledger acceptance criteria / Number of files received |
| | Perform Quality Check | Source data files received or captured from general ledgers do not agree with source data files received or captured from Trial Balance. | The total out of balance dollar amount, between general ledger and trial balance source data files. | Difference between the dollar amount of the general ledger and dollar amount of trial balance source data files. |
| | Format Data | Source data does not comply with data format standards | Percentage of data sources not complying with data format standards | Number of files not complying with data format standards / Number of files received |

FIG. 2A

| Metrics Related to Process | FUNCTION | DEFECT | RELATED TO PROCESS METRIC | OPERATIONAL DEFINITION / MEASUREMENT |
|---|---|---|---|---|
| PREPARATION | Matching | A significant change in average number of reconciling items, month to month | Percentage increase or decrease of reconciling items month to month | [Total number of reconciling items (current month) - Total number of reconciling items (prior month) ]/ total number of reconciling items (prior month) |
| | Matching | Any transaction matched manually (automatch was unsuccessful) | Percentage of items matched manually | The number of items matched manually / the total number of items matched |
| | Research & Root Cause Analysis | Any reconciling item(s) requiring research assistance from Process Owner/ Process Area Expert | Percentage of reconciling items requiring Process Owner or Process Area Expert research assistance | The number of reconciling items requiring Process Owner or Process Area Expert research assistance / the total number of reconciling items |
| | Research & Root Cause Analysis | Reconciling item is unidentified (root cause code unassigned) | Percentage of unidentified reconciling items not resolved | The number of reconciling items not resolved / the total number of reconciling items |
| | Identify & Action Exposure | Reconciling item represents a potential exposure | The dollar value of reconciling items identified as potential exposure | The amount of dollars at risk due to factors: age of item, materiality, risk of account |

FIG. 2B

Metrics Related to Quality

| | DEFECT | RELATED TO QUALITY METRICS | OPERATIONAL DEFINITION / MEASUREMENT | GUIDING PRINCIPLES |
|---|---|---|---|---|
| 1 | An unreconciled account | Number of unreconciled accounts | *Defined as the percentage of accounts not reconciled in accordance with prescribed criteria* | *Timeliness, Accountability, Capability, Risk* |
| 2 | A reconciliation out of balance | Gross dollar value of reconciliation out of balances | *Defined as the gross dollar value of reconciliation out of balances due to Unreconciled Accounts* | *Timeliness, Risk, Control* |
| 3 | An account reconciled with rework | First pass yield % of accounts reconciled without any rework | *Number of accounts reconciled right the first time / total number of accounts reconciled* | *Timeliness, Accountability, Capability* |

FIG. 3

SYSTEM AND METHOD FOR AUTOMATED COMPREHENSIVE RECONCILIATION PROCESSING

CROSS REFERENCE TO RELATED APPLICATIONS

This application claims benefit under 35 U.S.C. §119(a)-(d) to Indian Provisional Patent Application No. 3103/CHE/2007, filed at the Indian Patent Office on Dec. 26, 2007, all of which is hereby incorporated by reference in its entirety.

BACKGROUND OF THE INVENTION

1. Field of the Invention

The invention described herein relates to automated accounting processes, and in particular relates to reconciliation of accounts.

2. Background Art

The success of any reconciliation process relies on the data received as input. The input data must be accurate, complete, and timely. Moreover, the processing must be complete, and any irregularities must be detected and reported. Traditionally, the reconciliation process can be slow, tedious, and prone to human error. Inaccurate or incomplete inputs may not be recognized, and irregularities in inputs or outputs may not be noticed.

There is a need, therefore, for a system and method whereby the reconciliation process can be automated in a manner that checks for the timeliness, completeness, and accuracy of inputs, provides a checklist for the completeness of the reconciliation process, and recognizes and reports irregularities.

BRIEF DESCRIPTION OF THE DRAWINGS/FIGURES

FIG. 2A is a chart showing the defect metrics related to data capture process.

FIG. 2B is a chart showing the defect metrics related to preparation process.

FIG. 3 is a chart showing the defect metrics related to quality.

Figure 6A:
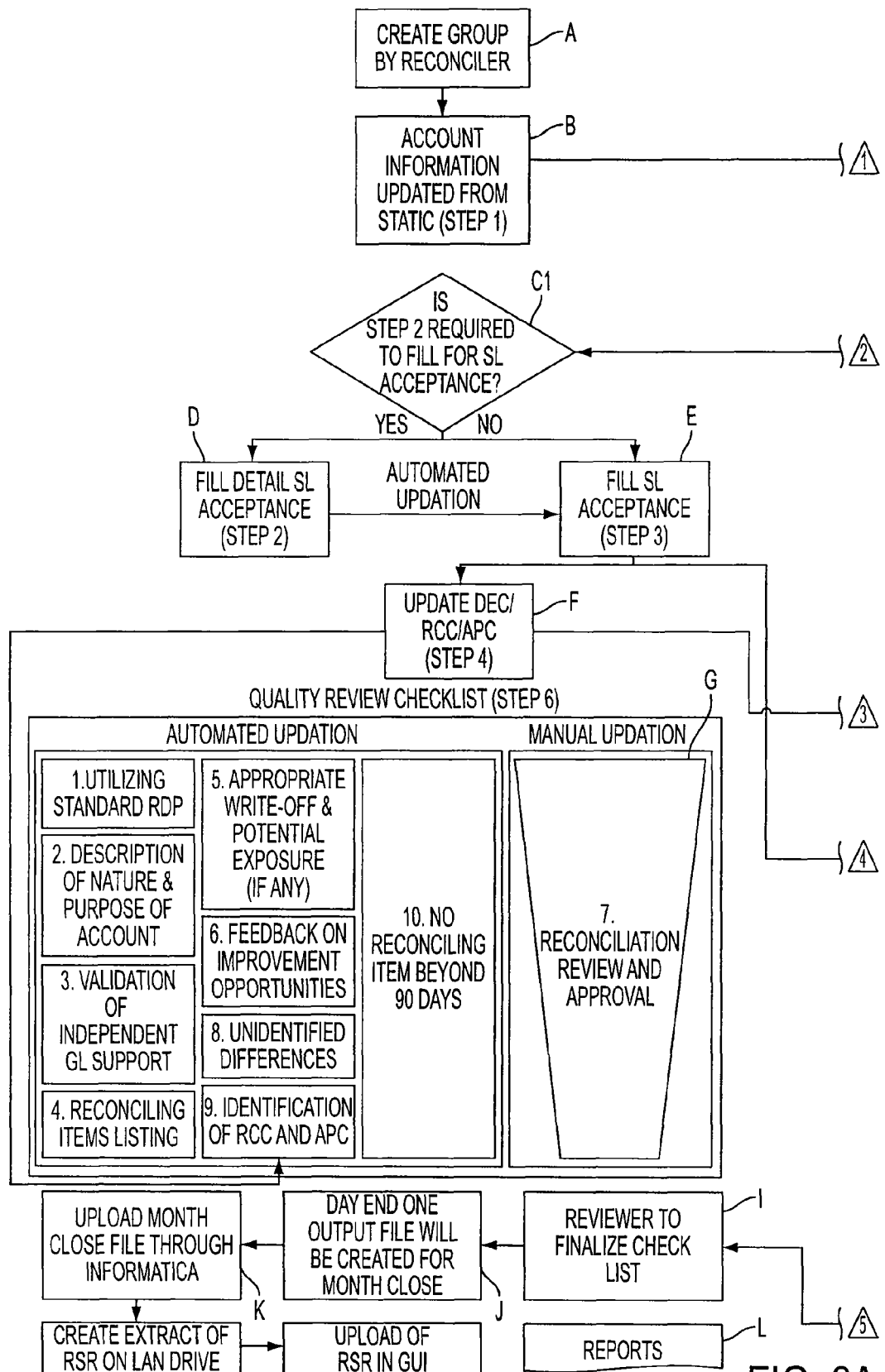
Figure 6B:
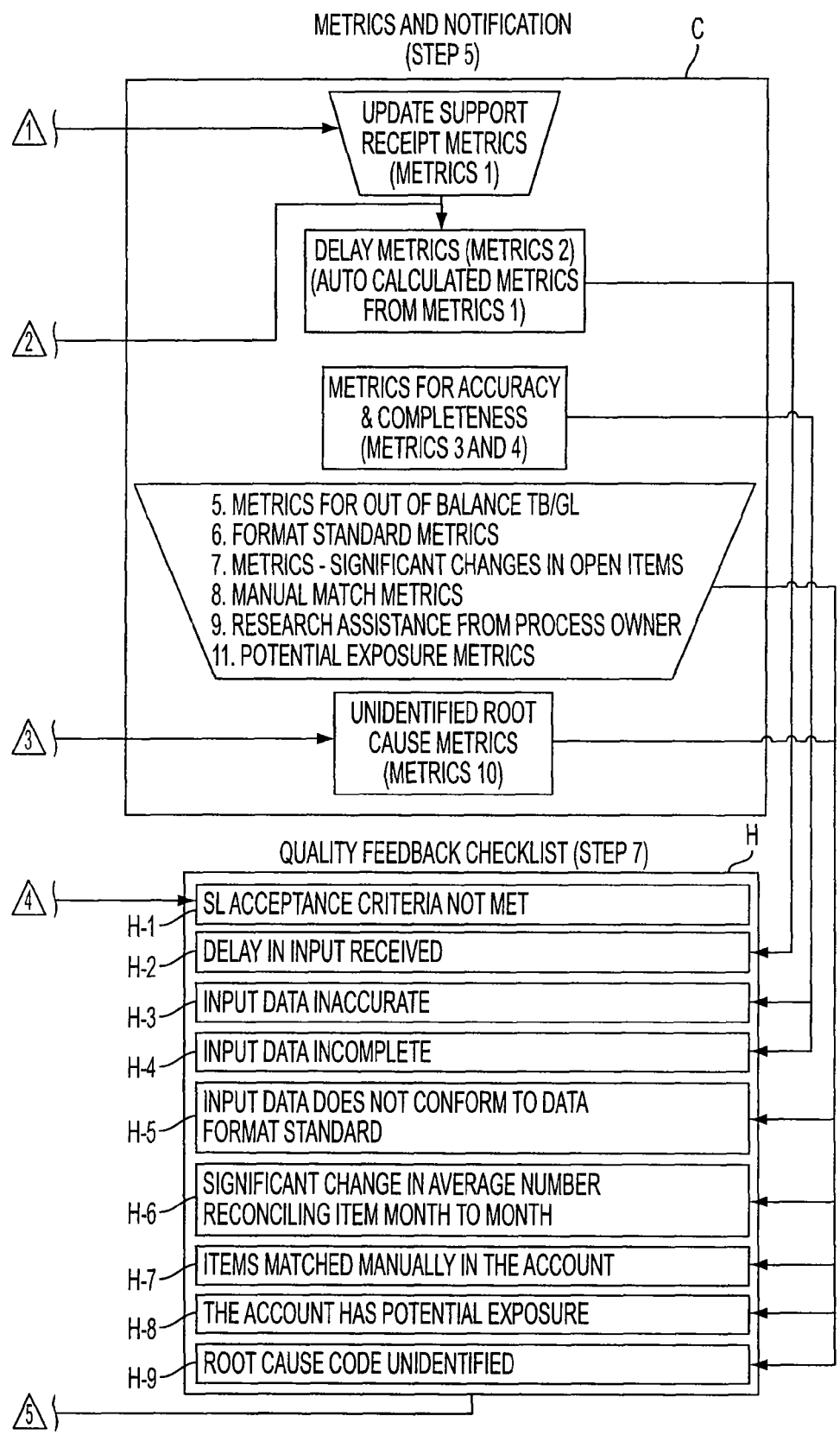

FIGS. 6A and 6B together constitute a flowchart providing a more detailed view of the processing of the invention, according to an embodiment thereof.

Further embodiments, features, and advantages of the present invention, as well as the operation of the various embodiments of the present invention, are described below with reference to the accompanying drawings.

DETAILED DESCRIPTION OF THE INVENTION

Reconciliation processing is a combination of manual and automated processing. This requires multiple steps of data validation. One of the key steps of reconciliation is the review and validation of the input and outputs. An embodiment of this invention includes the maintenance of an automated checklist of the various reconciliation steps, which enables maintaining an audit trail and the generation of metrics. A web-based system is designed to achieve the objectives of improving the reconciliation process and utilizing computerized controls.

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

Figure 1:
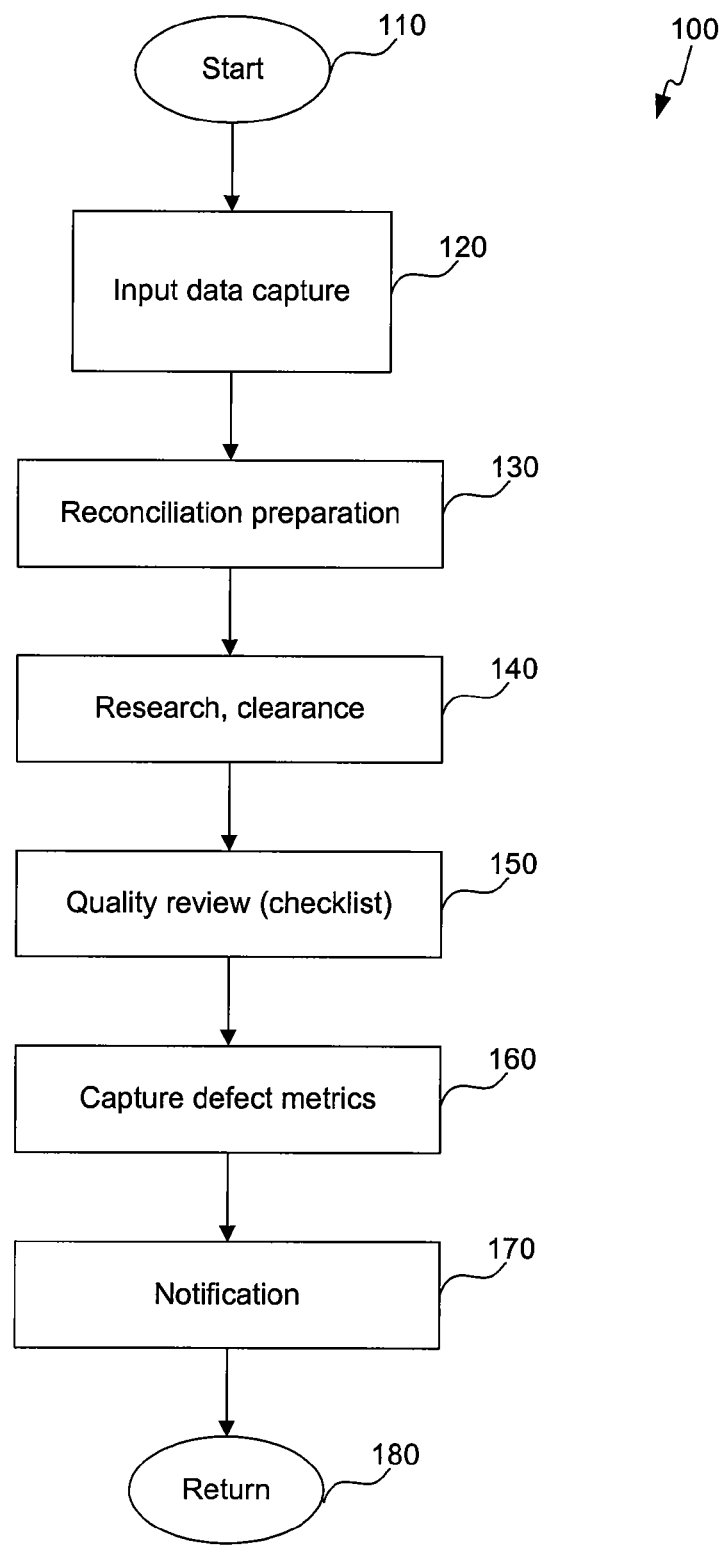
FIG. 1 is a flowchart illustrating the overall processing of an embodiment of the invention.

The overall processing of an embodiment of the invention is illustrated in FIG. 1 as process 100. The process begins at step 110. In step 120, input data is captured for the reconciliation process. The input data capture step 120 affects whether sub-ledger acceptance (SLA) criteria will be met, and allows for the determination of defects metrics related to inputs, as will be described in greater detail below. Input data capture also affects the subsequent notification process and quality feedback, which will also be described in greater detail below. Step 120 includes the following features in an embodiment of the invention:

Structured input SLA criteria is defined for receiving and reviewing the captured data inputs.

Inputs are tracked with respect to their due dates, and input delays are automatically captured.

An automatic escalation and notification process is used if an input is not received on a specified due date.

Input is tracked for review by a reconciliation analyst on a specified review date.

The automatic escalation and notification process is used if the input is not reviewed on the due date.

Input defects are captured if any input is not complete, not accurate, or not in the required format.

Defects in the input are captured in the form of data exception codes and defect metrics.

The automatic escalation and notification process is used if revised input is not received, once a defect is identified.

Month-end reporting is performed, identifying defects in the data capture process.

In step 130, the reconciliation is prepared. The various defects are tracked during the preparation activity. This step captures the following information in an embodiment of the invention:

the date on which reconciliation is finalized.

root cause code and action plan codes for defects, at the account level.

manual matching defects.

the change in the number of open items during the month.

In step 140, reconciliation research and clearance are performed. Here, the defects are tracked during the research activity in which previously collected data is reviewed. This step tracks the following, according to an embodiment of the invention:

root cause codes and action plan codes of the account.

items where root cause codes and action plan codes are not identified, or items that are not researched.

items that are open beyond a specified period, in violation of a reconciliation policy.

In step 150, the quality review is performed, according to an embodiment of the invention. This may be executed in the form of a checklist. This step captures the responses from the reconciliation analyst and an approval authority with respect to reconciliation issues. The account is then moved to a reconciled or unreconciled status. The checks include the following, in an embodiment of the invention:

Is the reconciliation completed with respect to a policy-defined reconciliation documentation package?
Are the nature and purpose of the account defined?
Is reconciliation input independent of the general ledger?
Is a detailed break-down available for all the open items?
Is appropriate write-off data or potential exposure identified?
Is quality feedback on improvement opportunities provided?
Is the reconciliation reviewed and approved?

Apart from the above, the reconciliation analyst and approval authority need to declare that the reconciliation meets the following criteria in order to show that the account is reconciled, in an embodiment of the invention:

There are no unidentified differences between the general ledger balance and the input (support/sub-ledger) balance.
Root causes and action plans have been identified at an account level or item level.
No reconciling items can remain open past a specified period (e.g., 90 days), as per the reconciliation policy for the account.

In step 160, defect metrics are captured according to an embodiment of the invention. This step will capture the defect metrics for reconciliation steps. These metrics are divided into two parts, metrics related to the reconciliation process shown in FIGS. 2A and 2B, and metrics related to quality shown in FIG. 3.

Returning to FIG. 1, in step 170, notification process takes place. While this is shown as a discrete step, alternatively the notification process occurs throughout the entire reconciliation process from the point of data capture to the point of clearance. This ensures timely and consistent communication to all necessary parties within the process regarding specific action to be taken. In conjunction with the monitoring of the reconciliation process, the expectation is to escalate and ensure resolution of any operational defects or exception handling. Such problems may be the result of inadequate front-end systems and processes affecting the overall quality of the reconciliation process. Necessary parties in this context might include first line managers, account auditors, and others with similar responsibility; in the context of escalated notification, necessary parties might also include senior managers and executives.

The process of FIG. 1 concludes with step 180.

Figure 4:
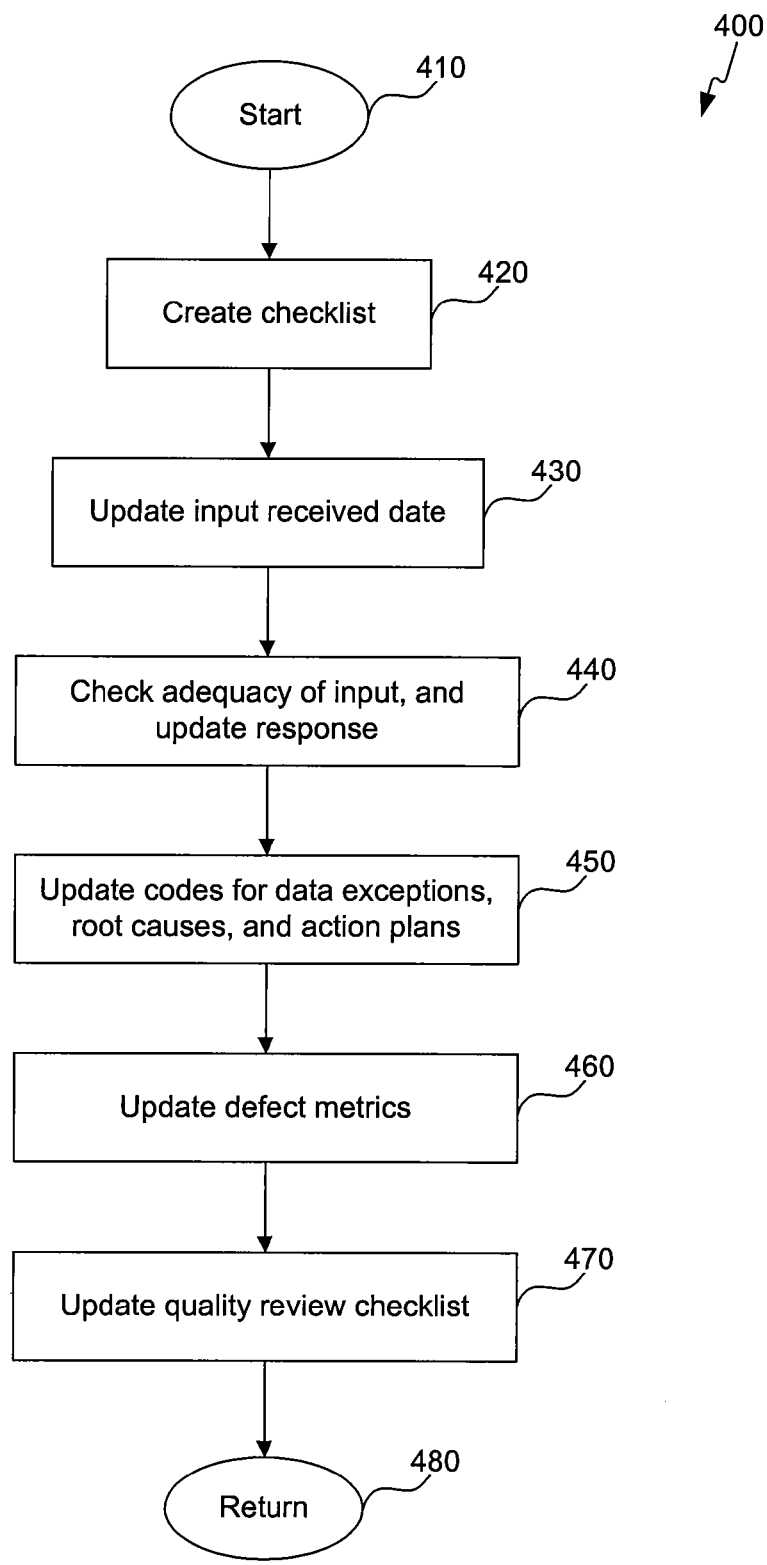
FIG. 4 is a flowchart illustrating the flow and management of data for the process of FIG. 1, according to an embodiment of the invention.

In conjunction with the process 100 of FIG. 1, a data flow process can also be implemented as a way of maintaining the data necessary to the above process 100. An example of such a data flow process is illustrated in FIG. 4 according to an embodiment of the invention.

The process begins with step 410. In step 420, the reconciliation analyst creates the checklist for one or multiple accounts. In step 430, the reconciliation analyst updates the input received date for which the check list is created. If input is not received on the defined due date, the system will automatically send notifications. In an embodiment of the invention, there can be multiple levels of notifications (e.g., four) that relate to different parties to be notified and/or the manner of notification. In step 440, the adequacy of the input is checked, and the response is updated. A user has the flexibility to review the input based on detailed check list or high-level checklist, in an embodiment of the invention. If input is not checked within the defined timeline, or if a defect is found in the input, the system will automatically send the notifications.

In step 450, the reconciliation analyst updates the data exception codes for any defects found in the input. The root cause and action plan codes can be automatically updated from master data. In step 460, the user or reconciliation analyst can update the defect metrics for the reconciliation process. Based on these metrics, the entire reconciliation process can be evaluated. In step 470, the reconciliation analyst and approval authority will update their response with respect to reconciliation check points that should be met by the reconciliation. The process concludes with step 480.

Figure 5A:
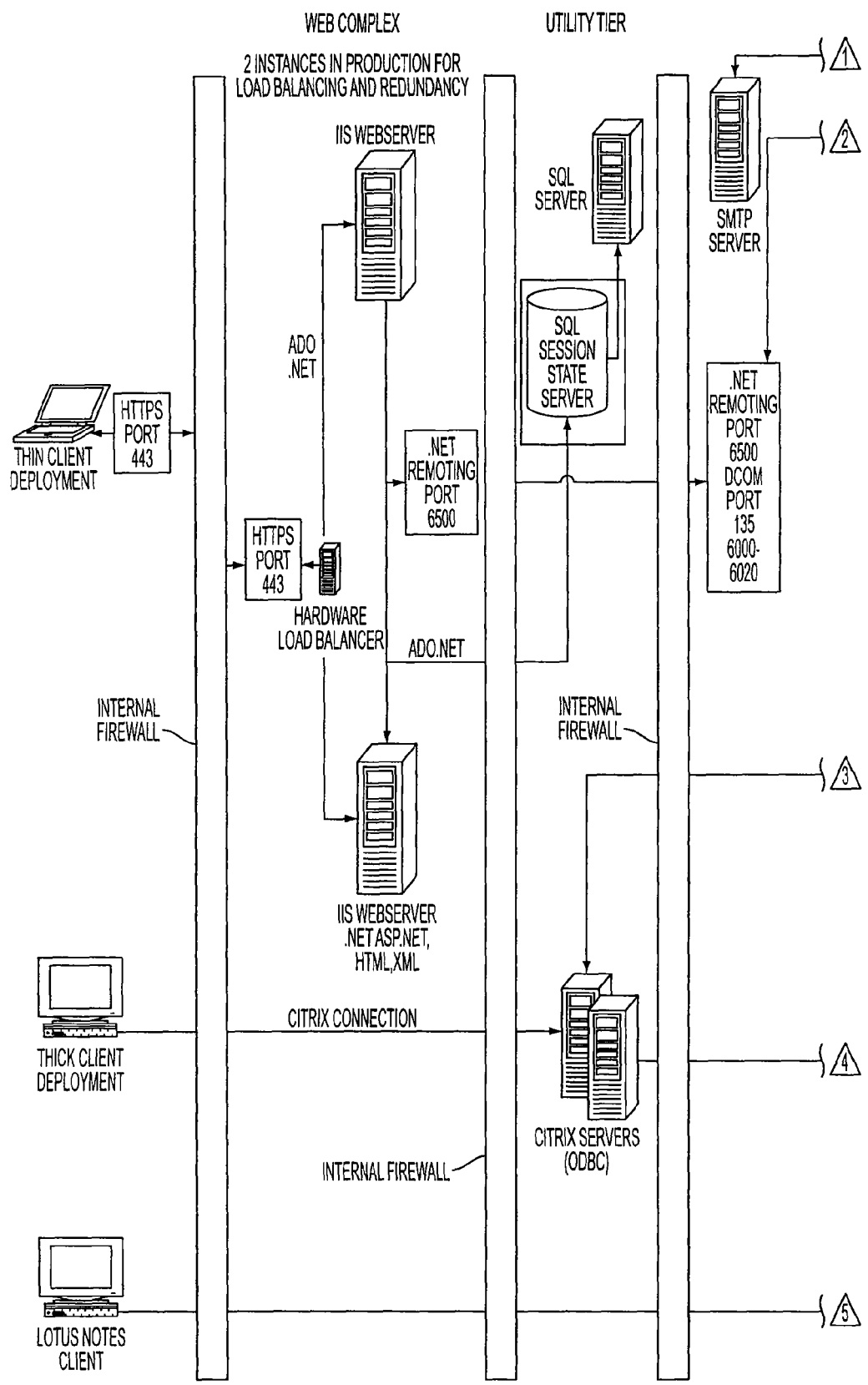
FIGS. 5A and 5B illustrate a computer system and network infrastructure in which an embodiment of the invention can be implemented.
Figure 5B:
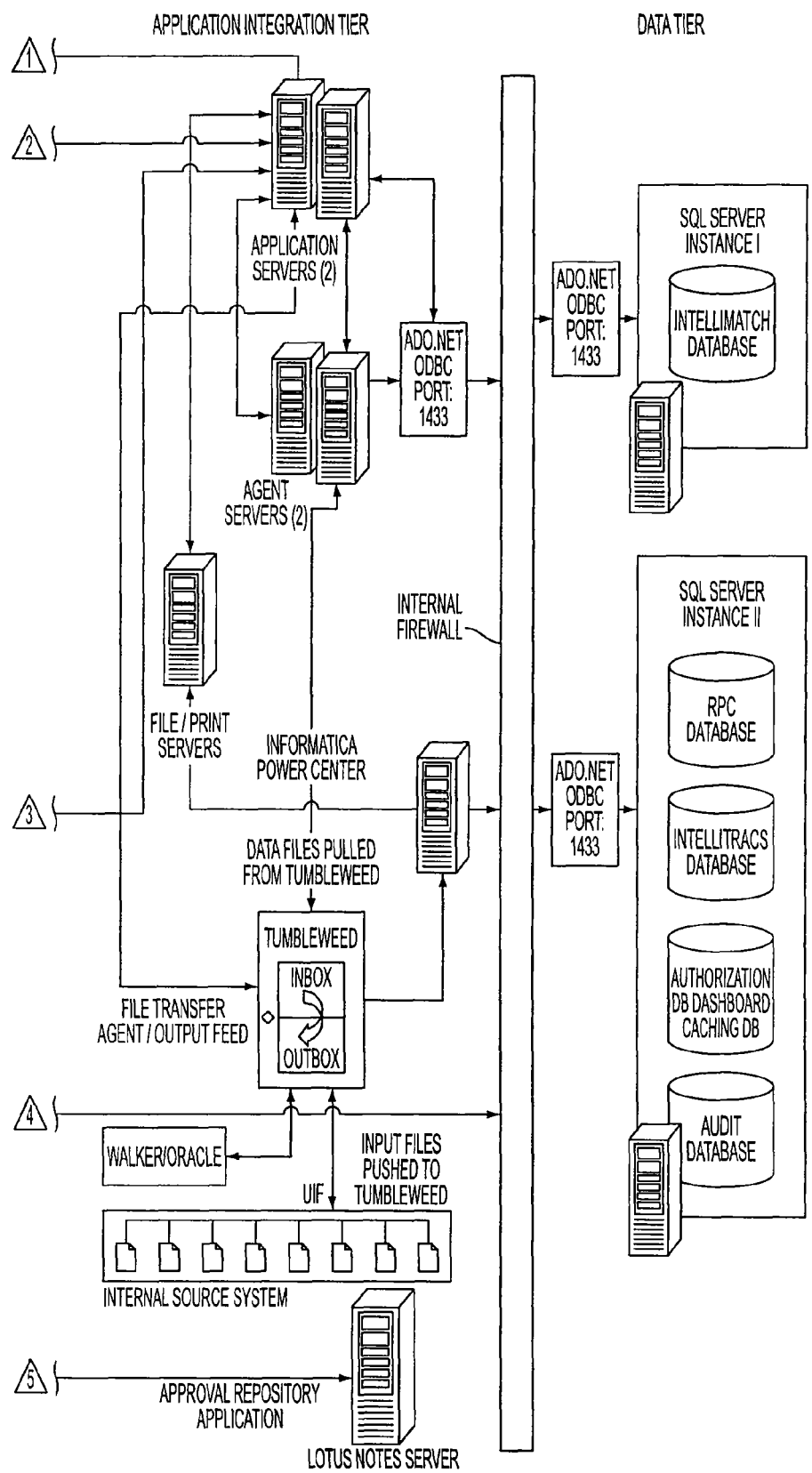

The logic for implementing the above processes can be implemented in hardware, firmware, software, or any combination thereof. In an embodiment of the invention, the logic is implemented as a computer program product containing instructions that can be stored in a memory medium executed on a processor in a general purpose computer or in a special-purpose, customized computer. Moreover, programs implementing the above processes can be made available to a reconciliation analyst, approval authority, or other user as a web-based application and/or through a computer network, as would be understood by a person of ordinary skill in the art. One computer system and network in which the above processes can be implemented is shown in FIGS. 5A and 5B. The processing of an embodiment of the invention in the context of such a system is shown in FIGS. 6A and 6B.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:
1. A method comprising:
   comparing, by a computer-based system for reconciliation of accounts, input data to master data, wherein a defect is identified in response to the input data not being equal to the master data;
   assigning, by the computer-based system, a first code in response to the input data not being equal to the master data, wherein the first code corresponds to a type of difference between the input data and the master data;

assigning, by the computer-based system, a second code in response to the input data not being equal to the master data, wherein the second code corresponds to a corrective action to reconcile the difference between the input data and the master data;

comparing, by the computer-based system, an input data received date to a first due date;

generating, by the computer-based system, a first plurality of notification messages in response to the input data received date being later than the first due date;

escalating, by the computer-based system, a first action associated with the input data received date being later than the first due date, wherein the first action is escalated according to a predetermined process associated with at least one of the first code and the second code;

comparing, by the computer-based system, an input data reviewed date to a second due date;

generating, by the computer-based system, a second plurality of notification messages in response to the input data reviewed date being later than the second due date;

escalating, by the computer-based system, a second action associated with the input data reviewed date being later than the second due date, wherein the second action is escalated according to a predetermined process associated with at least one of the first code and the second code; and generating, by the computer-based system, a third plurality of notification messages in response to the defect being detected in the input data.

2. The method of claim 1, further comprising receiving, by the computer-based system, the input data.

3. The method of claim 1, further comprising presenting, by the computer-based system, a web-based checklist based on at least one of the first code and the second code and configured to enable review of the input data.

4. The method of claim 1, further comprising receiving, by the computer-based system, a revised input data that corrects the defect in the input data.

5. The method of claim 4, further comprising generating, by the computer-based system, a fourth plurality of notification messages when the revised input is not received.

6. The method of claim 1, further comprising generating, by the computer-based system, a report identifying a defect in the input data.

7. The method of claim 1, further comprising updating, by the computer-based system, an account status, wherein the account status is one of: reconciled and unreconciled.

8. The method of claim 1, further comprising presenting, by the computer-based system, a quality review checklist that enables alteration of an account status.

9. The method of claim 8, wherein the account status is updated to reconciled where at least one of: there are no differences between a general ledger balance and a balance associated with the input data, the root cause code and action plan code are identified at an account level, and no defect associated with the account is open beyond a third due date.

10. The method of claim 1, wherein the defect is associated with a defect metric, and the defect metric is at least one of: critical to process and critical to quality.

11. The method of claim 1, wherein the defect is associated with a defect metric, and wherein the defect metric is critical to process in response to the input data being at least one of: not received by a service level agreement ("SLA") date, not received prior to the first due date, incomplete, inaccurate, and not compliant with a data format standard.

12. The method of claim 1, wherein the defect is associated with a defect metric, and wherein the defect metric is critical to process in response to at least one of: the input data being provided from a plurality of general ledgers and the input data not matching data associated with a trial balance list, there is a change in an average number of reconciling items, a transaction cannot be matched automatically, research being required to reconcile the input data, the root cause code cannot be assigned, and the input data representing a potential exposure.

13. The method of claim 1, wherein the defect is associated with a defect metric, and wherein the defect metric is critical to quality in response to at least one of: an account status being unreconciled, an account status being reconciled out of balance, and an account status being reconciled with rework.

14. The method of claim 1, wherein generating the third plurality of notification messages further comprises an escalation procedure.

15. An article of manufacture including a computer readable medium having instructions stored thereon that, in response to execution by a computer-based system for reconciliation of accounts, cause the computer-based system to perform operations comprising:

comparing, by the computer-based system, input data to master data, wherein a defect is identified in response to the input data not being equal to the master data;

assigning, by the computer-based system, a first code in response to the input data not being equal to the master data, wherein the first code corresponds to a type of difference between the input data and the master data;

assigning, by the computer-based system, a second code in response to the input data not being equal to the master data, wherein the second code corresponds to a corrective action to reconcile the difference between the input data and the master data;

comparing by the computer-based system, an input data received date to a first due date;

generating, by the computer-based system, a first plurality of notification messages in response to the input data received date being later than the first due date;

escalating, by the computer-based system, a first action associated with the input data received date being later than the first due date, wherein the first action is escalated according to a predetermined process associated with at least one of the first code and the second code;

comparing, by the computer-based system, an input data reviewed date to a second due date;

generating, by the computer-based system, a second plurality of notification messages in response to the input data reviewed date being later than the second due date;

escalating, by the computer-based system, a second action associated with the input data reviewed date being later than the second due date, wherein the second action is escalated according to a predetermined process associated with at least one of the first code and the second code; and generating, by the computer-based system, a third plurality of notification messages in response to the defect being detected in the input data.

16. A system comprising:

a tangible, non-transitory memory communicating with a processor for reconciliation of accounts, the tangible, non-transitory memory having instructions stored thereon that, in response to execution by the processor, cause the processor to perform operations comprising:

comparing, by the processor, input data to master data, wherein a defect is identified in response to the input data not being equal to the master data;

assigning, by the processor, a first code in response to the input data not being equal to the master data, wherein the first code corresponds to a type of difference between the input data and the master data;

assigning, by the processor, a second code in response to the input data not being equal to the master data, wherein the second code corresponds to a corrective action to reconcile the difference between the input data and the master data;

comparing by the processor, an input data received date to a first due date;

generating, by the processor, a first plurality of notification messages in response to the input data received date being later than the first due date;

escalating, by the processor, a first action associated with the input data received date being later than the first due date, wherein the first action is escalated according to a predetermined process associated with at least one of the first code and the second code;

comparing, by the processor, an input data reviewed date to a second due date;

generating, by the processor, a second plurality of notification messages in response to the input data reviewed date being later than the second due date;

escalating, by the processor, a second action associated with the input data reviewed date being later than the second due date, wherein the second action is escalated according to a predetermined process associated with at least one of the first code and the second code; and generating, by the processor, a third plurality of notification messages in response to the defect being detected in the input data.

* * * * *